Sept. 11, 1962  F. G. ROUNDS  3,053,341
LUBRICANT ADDITIVE
Filed Jan. 8, 1960
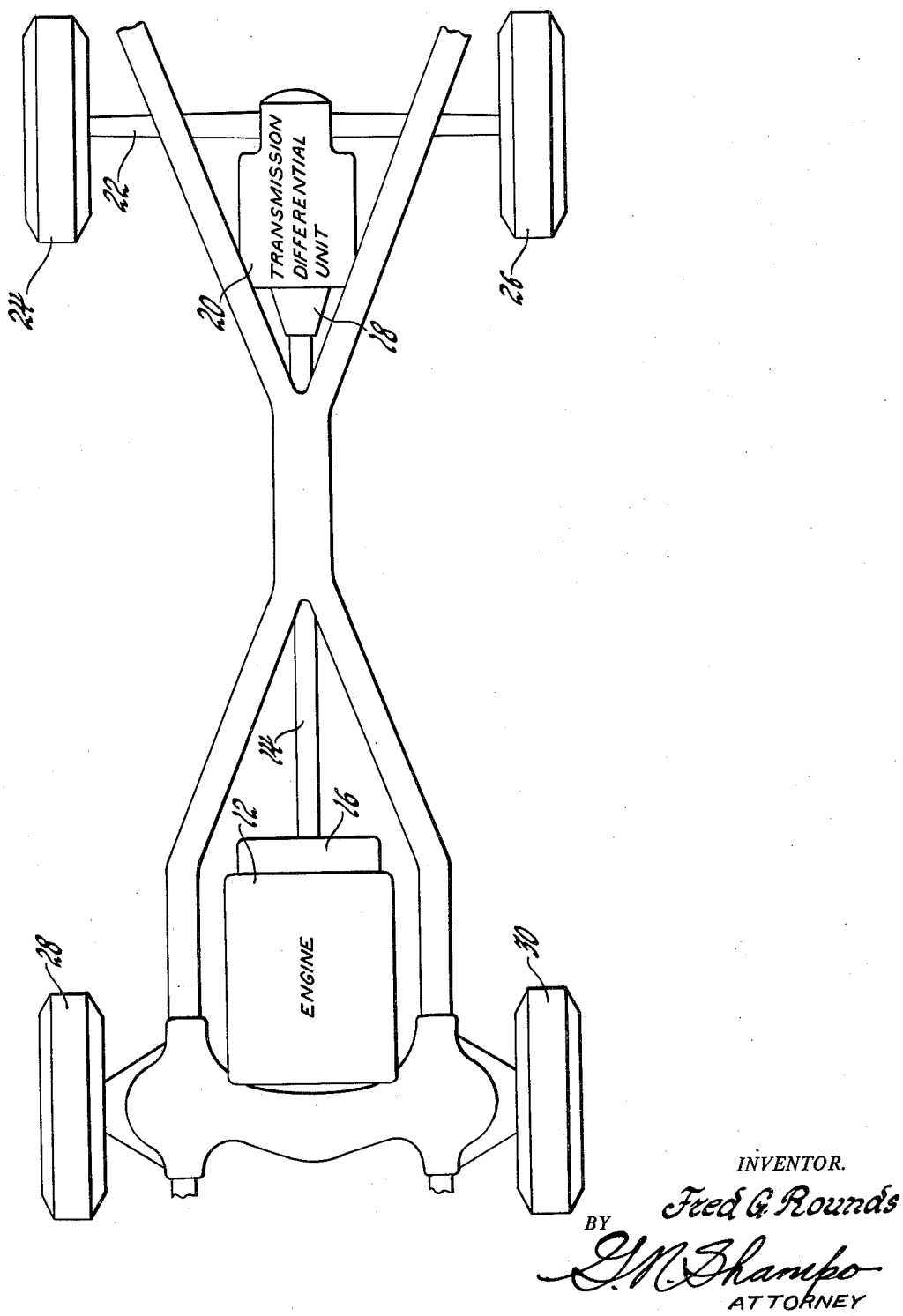
INVENTOR.
*Fred G. Rounds*
BY
*G. M. Shampo*
ATTORNEY United States Patent Office 3,053,341
Patented Sept. 11, 1962

3,053,341
LUBRICANT ADDITIVE
Fred G. Rounds, Royal Oak, Mich., assignor to General Motors Corporation, Detroit, Mich., a corporation of Delaware
Filed Jan. 8, 1960, Ser. No. 1,270
4 Claims. (Cl. 184—1)

This invention relates to a composite transmission-angular drive unit and to a method of lubricating such a device. More particularly the invention pertains to a composite assembly having a hydraulically controlled automatic transmission and a hypoid gear type differential which are lubricated by the same lubricant.

In recent years, with the rapid change in automobile design, the overall height of automobiles has been decreased. With this decrease in overall height a corresponding decrease in floor level of automobiles has been necessitated. Conventionally, the transmission of a front engine automobile is located immediately behind the motor and occupies a space which otherwise would form the lower part of the forward portion of the passenger compartment. With the lowering of the floor level of many late model passenger cars, the transmission occupies an even greater proportion of the lower forward area of the passenger compartment, magnifying an already objectionable hump in the floor of the passenger compartment.

By using a composite transmission-angular drive unit located in the usual rear axle area the undesirable transmission hump in the floor of an automobile passenger compartment can be materially reduced, even in automobiles having exceptionally low floor levels. Various other advantages inherent in this type of construction are also obtained.

The most desirable type of composite transmission-angular drive unit would be one which would be combined in a single housing utilizing the same lubricating fluid. There are many advantages in favor of using a single fluid in such a unit. Specifically, rotating shaft seals would not be required, resulting in greater design freedom, cost reduction and absence of production problems associated with seals. The amount of metal used in the unit is reduced as well as the amount of machining required for seal locations. Similarly, storage and dispensing facilities at the assembly plants for vehicles using such a unit are reduced and servicing requirements are reduced by one half. Also of importance is that if different conventional lubricants for the separate sections of the unit are used they may not be compatible with the same type of seal material. If so, additional problems may be caused by one of the lubricants attacking the seal resulting in an intermixing of the different lubricants.

The problems of developing a single lubricant, however, are multiple and dependent upon the nature of the composite unit. The requirements of the lubricant, or fluid, will differ somewhat, for example, depending upon whether bevel, spiral bevel or spiral hyperboloidal gears are used in the differential. Even greater differences in lubricant requirements are involved between manually shifted and hydraulically controlled automatic types, particularly fluid drive hydraulically controlled types. It is expected that both manual and hydraulically controlled automatic types will be used and that in both of these types the composite units will have the spiral hyperboloidal, or hypoid, gears.

Conventional automobile automatic transmissions, for example, are hydraulic torque transmitting devices which require substantially different lubricants from those which are used in conventional automobile differentials. Such a transmission requires a lubricant which is of a relatively low viscosity that does not vary considerably over a wide temperature range and which is stable at relatively high temperatures. The hypoid gears of a differential, on the other hand, heretofore have required extreme pressure additives in a lubricant of fairly high viscosity.

Of utmost importance in the formation of a satisfactory fluid of the subject type is that the fluid have all the characteristics required for satisfactory operation in a hydraulically controlled automatic transmission, yet also have E.P. characteristics which are so essential to satisfactory operation of hypoid gears. The essential problem in such a lubricant is that nearly all known extreme pressure agents will deleteriously affect the clutch plates of an automatic transmission and are, therefore, unsatisfactory.

The development of a composite automatic transmission-angular drive unit which uses a single lubricant has been heretofore impeded due to the above-described radical differences in the types of lubricants required. When automatic transmission fluids are used to lubricate hypoid gears, the hypoid gears are quickly scored and wear at a rapid rate. Accompanying the scoring and rapid wear during operation is an objectionably loud "howling" noise which is emitted from the gears.

On the other hand, an automatic transmission simply will not operate when filled with a typical differential lubricant. The various intricate fluid actuated controls of an automatic transmission require a low viscosity fluid in order to function properly and, accordingly, will, at best, malfunction with the higher viscosity differential lubricants. Moreover, if conventional extreme pressure additives are added to the usual automatic transmission fluids, various clutch facings of the automatic transmission exhibit deep pitting and wear rapidly. The clutches often begin to slip whereupon the transmission becomes inoperative. Moreover, in operation a transmission containing such a lubricant tends to "squeak" and is, in general, objectionably noisy. Moreover, even a small degree of attack is detrimental in which a locking of the clutches may occur or "shift feel" is greatly magnified.

It is therefore a principal object of this invention to provide a new and useful power drive means for use in motor vehicles and the like. It is a further object of the invention to provide a composite automatic transmission-angular drive unit in a single housing in which one lubricant is used to lubricate both parts of the composite unit. Another object of the invention is to provide a method of lubricating a composite automatic transmission and angular drive unit. A still further object of the invention is to provide a relatively low viscosity lubricant which is useful in lubricating gears which are subjected to extreme pressures.

Briefly, the invention comprehends a composite automatic transmission-angular drive unit having a lubricant which is composed essentially of a relatively low viscosity base material, such as an automatic transmission fluid containing an aliphatic phosphite homogeneously dispersed therein.

Other objects, features and advantages of the present invention will become more obvious from the following descripiton of preferred embodiments thereof and from the drawing which is a diagrammatic view of an automobile frame and driving means.

Referring now to the drawing, a typical automobile has a frame member 10 on which is supported a motor 12. A rotatably mounted propeller shaft 14 suitably connected at 16 to the motor 12 extends therefrom to the rear axle area of the frame. The end of the propeller shaft 14 opposite to that connected to the motor 12 is operatively connected at 18 to a composite transmission-angular drive unit 20 which is, in turn, in operative engagement with the rear axle shaft 22 inducing rotational movement thereof. The wheels 24 and 26 are attached to the rear axle 22 and the wheels 28 and 30 are suitably secured to the front portion of the frame to support the entire assembly. Thus, power developed by the motor 12 is delivered by the propeller shaft 14 to the composite transmission-angular drive unit 20 which, in turn, moves the rear axle 22 to rotate the wheels 24 and 26 and move the vehicle.

A composite automatic transmission-angular drive unit in which the transmission and angle drive gearing are lubricated with the same fluid disposed in a common sump is one such as disclosed in United States Patent No. 2,724,293 H. Guentsche et al., filed October 8, 1947 and assigned to the assignee of the present invention. My invention contemplates employing any hydraulically controlled torque transmitting device as an automatic transmission in the composite transmission-angular drive unit. One such device which can be adopted for use in my invention is that described in United States Patent No. 2,728,247 Snyder, patented December 27, 1955 and which is assigned to the assignee of the present invention. Numerous types of angular drive units which are known and described in the art can be used in the composite unit of my invention. Angular drive units can be used, for example, such as those which are described in United States Patents Nos. 2,408,926 Griffith and 2,548,258 Griffith, patented on October 8, 1946 and April 10, 1951, respectively, and owned by the assignee of the present invention.

My invention can be used to form a composite automatic transmission-differential unit with any fluid actuated automatic transmission and any differential unit which can be combined structurally in the same housing, such as the automatic type of transaxle used in the 1960 model Chevrolet Corvair. Of course, a common sump is preferably provided in the housing to function as a reservoir for more satisfactory lubrication of the various parts. The single housing provides for direct connection between the transmission and differential without any division, such as sealed compartments, to permit the use of a single lubricant for the basic components of the unit.

I have found that practical use of a composite automatic transmission-differential unit can be made when employing an improved lubricant for such an assembly. My improved lubricant is prepared by mixing a relatively low viscosity base material which is suitable for operation in an automatic transmission with an additive from the class of aliphatic phosphites in such a manner so as to uniformly distribute the additive throughout the mixture. The additive can be blended with the low viscosity base material in any convenient manner, such as by hand stirring, mechanical blending or the like.

Each low viscosity hydrocarbon lubricant which has been tested exhibits improved lubricating characteristics in a composite automatic transmission-differential unit when the lubricant is blended with a dialkyl phosphite. Any suitable automatic transmission fluid can be used to provide the supporting medium for the polyalkyl phosphite additive to form a satisfactory lubricant for the composite unit. Fluids such as those described in United States Patents Nos. 2,851,421 and 2,851,422 are suitable as automatic transmission fluids.

An automatic transmission fluid basically requires a hydrocarbon starting material which has a viscosity of at least 40 seconds S.U.S. at 210° F. and less than about 64,000 centipoises at minus 40° F. Generally, such lubricants contain numerous types of additional additives which improve the overall characteristics of the lubricant. Additives are included in the blend to function as anti-corrosive agents, anti-foaming agents, anti-rust agents, friction modifiers, detergents, anti-oxidants, viscosity improvers, etc.

In particular I have found that the dialkyl phosphites of the polyalkyl phosphites provide the most effective results. Dialkyl phosphites have a general structural formula as follows:

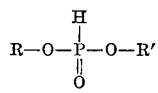

A hydrocarbon chain (R or R') having a length up to about 16 carbon atoms is generally considered to be useful in the invention. Best results have been obtained when the alkyl group or hydrocarbon chain is of the normal or unbranched type. Although some benefits are achieved with the lower molecular weight alkyl groups or carbon chains, more significant results are obtained with normal carbon chains over about 4 carbon atoms. Best results, however, have been obtained with even longer carbon chains in the alkyl portion of the compound, particularly those having more than 8 carbon atoms. The extreme pressure lubricating characteristics of the automatic transmission fluids have been improved when small amounts of dibutyl phosphite and dioctyl phosphite were included in the blend. A particularly successful blend was one containing small amounts of didodecyl phosphite. In certain instances phosphite compounds containing unsaturated hydrocarbon chains may be satisfactory, particularly the heavier, unsaturated hydrocarbon chains which form phosphite compounds soluble in a conventional automatic transmission fluid.

The extreme pressure lubricating characteristics of compositions comprehended by my invention will be improved for high load conditions by even small but effective amounts of the phosphite, up to as high as about 6% by weight. However, in most instances, amounts in excess of about 6% by weight may provide a diminishing proportional improvement with respect to the amount of the phosphite which is added. Therefore, in general, I prefer to employ from small but effective amounts to as high as about 6% of the dialkyl phosphite. Especially satisfactory results have been obtained when di(n-dodecyl) phosphite has been used in amounts of about 2%, by weight. However, such a phosphite compound can be effective in providing improved E.P. characteristics in amounts as low as ¼%. It is to be understood, however, that the precise amount of the phosphite which will provide optimum results may vary due to interaction with the balance of the additives present in the fluid.

The clutch plate material which is presently being used in automatic transmissions is generally of the character described in United States Patents Nos. 2,733,797 Almen et al.; 2,733,798 Almen et al. and 2,819,987 Maierson et al., all of which are assigned to the assignee of the present invention. These particular friction materials are a fibrous facing composition used in clutches and the like and contain fibrous materials, such as cotton linters, asbestos, synthetic viscous wool or glass wool together with friction modifiers such as leather dust, fuller's earth, red iron oxide and the like. Such a material is bonded with a thermosetting plastic, such as a phenol formaldehyde resin, to form a porous facing having good friction characteristics and high resistance toward wear. Such facings can be generally referred to as plastic resin impregnated paper type clutch facings. It is with respect to this type of friction material where the problem of attack by fluids containing extreme pressure additives is especially critical. Apparently friction materials of this nature are especially susceptible to reaction with an automatic transmission fluid containing extreme pressure additives.

My invention can provide unusually and unexpectedly satisfactory results when used as a fluid in a composite unit of the instant type having an automatic hydraulically controlled transmission with such clutch facings, particularly such transmissions which are of the fluid drive type.

Although my invention has been described in connection with certain specific examples thereof, no limitation is intended thereby except as defined in the appended claims.

I claim:
1. A composite automatic transmission-angular drive unit comprising a housing, a hydraulically controlled automatic transmission having fibrous clutch plates in said housing, angular drive means having spiral hyperboloidal gears in said housing in operative engagement with said transmission, a sump in said housing for delivering lubricant to said transmission and said drive means and a lubricant in said sump, said lubricant consisting essentially of a relatively low viscosity hydrocarbon base lubricant and about ¼–6%, by weight, of a dialkyl phosphite having alkyl groups containing more than eight carbon atoms.

2. A composite automatic transmission-angular drive unit comprising a housing, a hydraulically controlled automatic transmission having fiberous clutch plates in said housing, angular drive means having spiral hyperboloidal gears in said housing in operative engagement with said transmission, a sump in said housing for delivering lubricant to said transmission and said drive means and a lubricant in said sump, said lubricant consisting essentially of a hydraulically controlled automatic transmission fluid and about ¼–6%, by weight, of dialkyl phosphite, each of the alkyl groups in said phosphite having about 8 through 16 carbon atoms, respectively.

3. A composite automatic transmission-angular drive unit comprising a housing, a hydraulically controlled automatic transmission having fibrous clutch plates in said housing, angular drive means having spiral hyperboloidal gears in said housing in operative engagement with said transmission, a sump in said housing for delivering lubricant to said transmission and said drive means and a lubricant in said sump, said lubricant consisting essentially of a hydraulically controlled automatic transmission fluid and about ¼–6%, by weight, of didodecyl phosphite.

4. A composite automatic transmission-angular drive unit comprising a housing, a hydraulically controlled automatic transmission having fibrous clutch plates in said housing, angular drive means having spiral hyperboloidal gears in said housing in operative engagement with said transmission, a sump in said housing for delivering lubricant to said transmission and said drive means and a lubricant in said sump, said lubricant consisting essentially of a hydraulically controlled automatic transmission fluid and about ¼–6%, by weight, of dioctyl phosphite.

References Cited in the file of this patent

UNITED STATES PATENTS

| | | |
|---|---|---|
| 2,080,299 | Benning et al. | May 11, 1937 |
| 2,285,853 | Downing et al. | June 9, 1942 |
| 2,470,405 | Leland | May 17, 1949 |
| 2,528,348 | Denison et al. | Oct. 31, 1950 |
| 2,683,120 | Jennings et al. | July 6, 1954 |
| 2,724,293 | Guentsche et al. | Nov. 22, 1955 |